United States Patent
Rácz et al.

(10) Patent No.: US 9,654,362 B2
(45) Date of Patent: *May 16, 2017

(54) METHODS, RADIO BASE STATION AND RADIO NETWORK CONTROLLER

(71) Applicant: Telefonaktiebolaget LM Ericsson (publ), Stockholm (SE)

(72) Inventors: Sándor Rácz, Cegléd (HU); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,609

(22) Filed: Mar. 28, 2016

(65) Prior Publication Data

US 2016/0212030 A1    Jul. 21, 2016

Related U.S. Application Data

(63) Continuation of application No. 13/700,515, filed as application No. PCT/SE2012/051218 on Nov. 8, 2012, now Pat. No. 9,325,594.

(Continued)

(51) Int. Cl.
*H04L 12/26* (2006.01)
*H04L 1/16* (2006.01)
(Continued)

(52) U.S. Cl.
CPC ............ *H04L 43/0829* (2013.01); *H04L 1/08* (2013.01); *H04L 1/1621* (2013.01);
(Continued)

(58) Field of Classification Search
None
See application file for complete search history.

(56) References Cited

U.S. PATENT DOCUMENTS

| 7,706,405 B2 | 4/2010 | Terry et al. |
| 8,542,607 B2 * | 9/2013 | Lindskog ............. H04L 1/1832 370/252 |

(Continued)

FOREIGN PATENT DOCUMENTS

| EP | 2276316 A1 | 1/2011 |
| HU | WO 2005104672 A2 * | 11/2005 ............. H04L 47/10 |

(Continued)

OTHER PUBLICATIONS

3GPP, "3rd Generation Partnership Project; Technical Specification Group Radio Access Network; High Speed Packet Access (HSDPA) multipoint transmission (Release 11)", 3GPP TR 25.872 V11.0.0, Sep. 2011, 1-29.

(Continued)

*Primary Examiner* — Chi H Pham
*Assistant Examiner* — Vladislav Agureyev
(74) *Attorney, Agent, or Firm* — Murphy, Bilak & Homiller, PLLC

(57) ABSTRACT

A method performed in a first radio base station, RBS, in communication with a radio network controller, RNC. The RNC is configured for multi-flow HSDPA, High-Speed Downlink Packet Access, operation and packet data units, PDUs, are communicated toward a user equipment, UE, node via the first RBS and at least one second RBS. The method comprises: detecting PDU drop events and/or loss events; and communicating information from the RBS to the RNC, notifying of each detected PDU drop event and/or loss event. A corresponding RBS and RNC are also presented.

16 Claims, 5 Drawing Sheets

Related U.S. Application Data

(60) Provisional application No. 61/558,174, filed on Nov. 10, 2011.

(51) Int. Cl.
*H04L 1/18* (2006.01)
*H04W 24/10* (2009.01)
*H04L 1/08* (2006.01)
*H04L 12/801* (2013.01)
*H04L 1/00* (2006.01)

(52) U.S. Cl.
CPC .......... *H04L 1/1642* (2013.01); *H04L 1/1671* (2013.01); *H04L 1/1835* (2013.01); *H04L 1/1848* (2013.01); *H04L 1/1874* (2013.01); *H04L 43/04* (2013.01); *H04W 24/10* (2013.01); *H04L 47/34* (2013.01); *H04L 2001/0097* (2013.01)

(56) References Cited

U.S. PATENT DOCUMENTS

| | | | | |
|---|---|---|---|---|
| 2003/0086427 | A1* | 5/2003 | Lee | H04L 1/1642 370/394 |
| 2003/0123479 | A1* | 7/2003 | Lee | H04L 47/10 370/466 |
| 2004/0042436 | A1 | 3/2004 | Terry et al. | |
| 2006/0135163 | A1* | 6/2006 | Obuchi | H04L 1/0066 455/436 |
| 2006/0159016 | A1* | 7/2006 | Sagfors | H04L 47/12 370/230 |
| 2007/0008990 | A1* | 1/2007 | Torsner | H04L 1/18 370/473 |
| 2008/0064390 | A1* | 3/2008 | Kim | H04W 60/00 455/425 |
| 2009/0052407 | A1* | 2/2009 | Motegi | H04W 88/08 370/336 |
| 2009/0213729 | A1* | 8/2009 | Zhang | H04L 1/1607 370/216 |
| 2010/0039996 | A1* | 2/2010 | Ohta | H04L 47/10 370/328 |
| 2010/0080121 | A1* | 4/2010 | Shimada | H04B 7/022 370/230 |
| 2010/0238803 | A1 | 9/2010 | Racz et al. | |
| 2011/0013567 | A1* | 1/2011 | Torsner | H04L 1/1621 370/328 |
| 2011/0235634 | A1* | 9/2011 | Fukuda | H04L 47/34 370/389 |
| 2011/0268088 | A1* | 11/2011 | Lindskog | H04L 1/1874 370/331 |

FOREIGN PATENT DOCUMENTS

| | | | | |
|---|---|---|---|---|
| SE | WO 2009058085 A2 * | 5/2009 | | H04L 47/10 |
| WO | 2005104672 A2 | 11/2005 | | |
| WO | 2009058084 A1 | 5/2009 | | |
| WO | 2009058085 A2 | 5/2009 | | |
| WO | 2013066252 A1 | 5/2013 | | |
| WO | 2013066258 A3 | 5/2013 | | |

OTHER PUBLICATIONS

3GPP, "3rd Generation Partnership Project; Technical Specification Group Radio Access Network; UTRAN Iub Interface User Plane Protocols for Common Transport Channel data streams (Release 6)", 3GPP TS 25.435 V6.5.0, Sep. 2008, 1-43.

Pályi, et al., "Window-based HSDPA Transport Network Congestion Control", 2010 European Wireless Conference, Lucca, Italy, Apr. 12-15, pp. 123-131.

Unknown, Author, "Discussion on packet skew in Inter-NB multi-flow transmission", 3GPP TSG-RAN WG2 Meeting #76, R2-115870, Alcatel-Lucent, San Francisco, USA, Nov. 14-18, 2011, 1-3.

Unknown, Author, "Discussion on Skewed Packet Reception in HSDPA Multipoint Transmission", 3GPP TSG-RAN WG2 Meeting #75bis, R2-114925, Alcatel-Lucent, Zhuhai, China, Oct. 10-14, 2011, 1-3.

Unknown, Author, "Discussion on Skewed Packet Reception in HSOPA Multipoint Transmission", 3GPP TSG-RAN WG2 Meeting #75, R2-114081, Alcatel-Lucent, Athens, Greece, Aug. 22-26, 2011, 1-3.

Unknown, Author, "Introduction of MIMO for 1.28Mcps TDD", 3GPP TSG• Ran WG2 #65, R2-091880, Athens, Greece, Feb. 9-13, 2009, 1-9.

Unknown, Author, "On RLC split for inter-site multi-point transmission in HSDPA", 3GPP TSG RAN WG2 Meeting #76, R2-116059, QUALCOMM Incorporated, San Francisco, US, Nov. 14-18, 2011, 1-7.

Unknown, Author, "Processing-Efficient RLC Headers for High Rates", 3GPP TSG-RAN WG2 Meeting #66, R2-093155, QUALCOMM Europe, San Francisco, USA, May 4-8, 2009, 1-3.

* cited by examiner

| 200<br>Drop Reason | 201<br>Spare |
|---|---|
| 210a<br>PDU before Identifier ||
| 210b<br>PDU before Identifier (cont) ||
| 210c<br>PDU before Identifier (cont) ||
| 211a<br>PDU after Identifier ||
| 211b<br>PDU after Identifier (cont) ||
| 211c<br>PDU after Identifier (cont) ||

198

METHODS, RADIO BASE STATION AND RADIO NETWORK CONTROLLER

TECHNICAL FIELD

The invention relates to multi-flow High-Speed Downlink Packet Access operation and particularly to drop and/or loss events in multi-flow operation.

BACKGROUND

In cellular networks, HSDPA (High-Speed Downlink Packet Access) systems are continuously developing to improve performance. The development includes several features in both UL (Uplink) and DL (Downlink) to enhance system performance and capacity as well as enabling a better user experience. Examples of developments are downlink MIMO (Multiple Input Multiple Output) (3GPP TR (Third Generation Partnership Project Technical Report) 25.872 Release 7) and dual cell/dual band HSDPA (3GPP TR 25.872 Release 8 & 9). There is also work going on to specify Multi-flow HSDPA (MF-HSDPA) Data Transmission for 3GPP TR 25.872 Release 11.

The concept of MF-HSDPA is to allow UEs (User Equipment nodes, also referred to as mobile/wireless terminals) to receive HSDPA data from two separate cells. The cells can belong to the same Node B (intra site MF-HSDPA) or to different Node Bs (inter site MF-HSDPA). In the former case, the solution is similar to DC-HSDPA (Dual Cell HSDPA, also known as Dual Carrier HSDPA), but on the same frequency, with a data split in the MAC-ehs (Media Access Control—enhanced high speed) layer. In the inter site case, the split may be in either the PDCP (Packet Data Convergence Protocol) or RLC (Radio Link Control) layer.

A potential benefit of introducing MF-HSDPA is that cell edge users may suffer from bad coverage and/or low throughput which brings down the overall system capacity. If these users could use available resources from neighbouring cells, i.e. receive data also from the non-serving cell, their situation could be significantly improved. This would improve the overall system capacity and the user performance for cell edge users.

HSDPA is described in further detail in HSDPA Multipoint Transmission, 3GPP TR 25.872.

When RLC transmissions get stuck on one link, it may be a good alternative to retransmit the RLC PDU(s) (Protocol Data Unit(s)) over the other link. If the retransmission cannot get through over the other link either, further retransmissions could be switched back to the original link. However, in this case there could be old copies existing at the link(s) besides the last retransmitted copy. Duplicate copies can result in lower application level throughputs.

SUMMARY

It is an object to reduce the risk of duplicate data units when using multi flow HSDPA.

According to a first aspect, it is presented a method performed in a first radio base station, RBS, in communication with a radio network controller, RNC. The RNC is configured for multi-flow HSDPA, High-Speed Downlink Packet Access, operation and packet data units, PDUs, are communicated toward a user equipment, UE, node via the first RBS and at least one second RBS. The method comprises: detecting PDU drop events and/or loss events; and communicating information from the RBS to the RNC, notifying of each detected PDU drop event and/or loss event.

By sending the notification of PDU drop/loss as an explicit indication, this can be communicated to the RNC before the UE detects these. This improves RLC behaviour and reduces RLC protocol problems due to multi-flow or other related effects.

The detected PDU drop event may correspond to a drop from a MAC-hs/ehs, Media Access Control—high speed/ enhanced high speed, queue. In other words, the drop could be a deliberate drop by the RBS, which is then communicated to the RNC.

The detected PDU loss event may correspond to a loss in a transport network interconnecting the RNC and at least one of the first RBS and the second RBS. In other words, when the RBS detects an unintended loss of a packet in the transport network, this is communicated to the RBS.

The loss in a transport network may be detected based on a sequence number. For example, if there is a gap in sequence numbers, this indicates a lost PDU.

The sequence number may be a sequence number according to Iub FP, Frame Protocol.

The loss in a transport network may be detected based on the sequence number and a delay reference time field of received Iub FP data frames.

In the communicating information, the information communicated from the RBS to the RNC, notifying of a detected PDU drop event and/or loss event, may be configured to cause the RNC to retransmit a PDU associated with the detected PDU drop event and/or loss event.

The communicating information from the RBS to the RNC, notifying of each detected PDU drop event and/or loss event, may comprise: communicating the information including a sequence number and/or a DRT, Delay Reference Time and CRC, Cyclic Redundancy Check, of an Iub DF, Data Frame, in which the PDU was received by the RBS.

In the communicating information, the information may comprise the first two octets of the PDU associated with the respective drop event and/or loss event.

In the communicating information, the information may comprise a CRC of a DF related to the PDU associated with the respective drop event and/or loss event.

In the communicating information, the information may comprise a position of the MAC-d, Medium Access Control Dedicated Data, PDU in an Iub DF.

In the communicating information, the information may provide an indication of Iub frames received right before and right after a detected Iub frame loss.

In the communicating information, the information may comprise the first two octets of the PDUs that were received right before and right after a gap due to TN, Transport Network, loss of the PDU associated with the respective drop event and/or loss event.

In the communicating information, the information may comprise an RLC header associated with the dropped PDU.

In the communicating information, the information may comprise a header of the last PDU in a frame before a gap due to TN loss.

In the communicating information, the information may comprise the header of the first PDU in a frame after a gap due to TN loss.

In the communicating information, the information may comprise a DRT field, an FSN, Frame Sequence Number, field and a CRC of Iub Data Frames that were received right before and right after a gap due to TN loss.

In the communicating information, the information may comprise the following fields: drop reason, number of PDUs dropped, and identifiers of all PDUs dropped.

In the communicating information, the information may comprise the following fields: drop reason, identifier of the last PDU before the lost PDU and identifier of the first PDU after the lost PDU.

According to a second aspect, it is presented a radio base station, RBS, arranged to be in communication with a radio network controller, RNC, the RNC being configured for multi-flow HSDPA, High-Speed Downlink Packet Access, operation. Packet data units, PDUs, are arranged to be communicated toward a user equipment, UE, node via the RBS and at least one second RBS. The radio base station comprises: a processor; and a computer program product storing instructions that, when executed by the processor, causes the radio base station to: detect PDU drop events and/or loss events; and communicate information from the RBS to the RNC, notifying of each detected PDU drop event and/or loss event.

According to a third aspect, it is presented a method performed in a radio network controller, RNC. The RNC is configured for multi-flow HSDPA, High-Speed Downlink Packet Access, operation, and packet data units, PDUs, are communicated toward a first user equipment, UE, node UE via at least two radio base stations, RBSs. The method comprises: receiving first information from a first RBS of the at least two RBSs, notifying of a PDU drop event and/or loss event detected by the first RBS; and retransmitting the PDU associated with the detected PDU drop event and/or loss event toward the UE in response to the received first information.

The retransmitting may comprise retransmitting the PDU through a different route that includes a second RBS.

The method may further comprise: storing second information at the RNC, including the sequence number and/or the DRT and CRC of the Iub DF in which the PDU was transmitted to the RBS; and comparing the first and second information to identify the PDU to be retransmitted.

The method may further comprise receiving the second information.

The storing second information may comprise storing a hash value in a hash repository representing the second information; and the comparing may comprise comparing the hash value representing the second information with a hash value representing the first information, to identify the PDU to be retransmitted.

According to a fourth aspect, it is presented a radio network controller, RNC, being configured for multi-flow HSDPA, High-Speed Downlink Packet Access, operation. Packet data units, PDUs, are arranged to be communicated toward a first user equipment, UE, node UE via at least two radio base stations, RBSs. The radio network controller comprises: a processor; and a computer program product storing instructions that, when executed by the processor, causes the radio network controller to: receive first information from a first RBS of the at least two RBSs, notifying of a PDU drop event and/or loss event detected by the first RBS; and retransmit the PDU associated with the detected PDU drop event and/or loss event toward the UE in response to the received first information.

It is to be noted that any feature of the first, second, third and fourth aspects, may, where appropriate, be applied to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
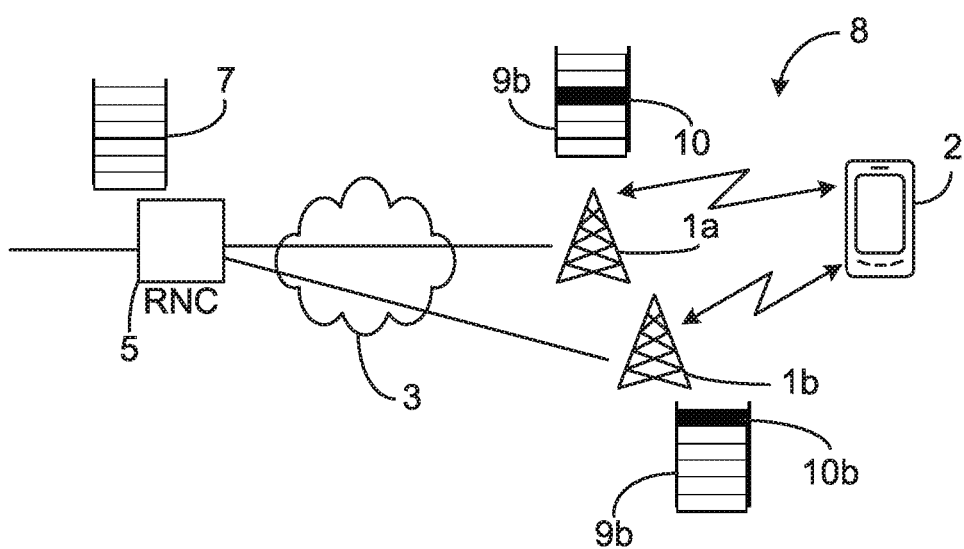
FIG. 1 is a schematic drawing illustrating an environment where embodiments presented herein can be applied.

FIG. 1 is a schematic diagram illustrating a cellular network 8 where embodiments presented herein may be applied. The cellular communications network 8 comprises a core network (not shown), a radio network controller (RNC) and two or more radio base stations (RBSs) 1a-b, here in the form of Node Bs, also known as NodeBs or NBs. The radio base stations 1a-b could also be in the form of evolved Node Bs, BTSs (Base Transceiver Stations) and/or BSSs (Base Station Subsystems), etc. The radio base stations 1a-b provide radio connectivity to a plurality of user equipment nodes (UEs) 2 (where one is shown in FIG. 1). The term UE is also known as wireless terminal, mobile terminal, user terminal, user agent, etc. The radio base stations 1 are also connected via a transport network 3 to the radio network controller (RNC) 5 for radio network control, and connectivity to central functions and other networks.

The cellular network 8 may e.g. comply with any one or a combination of W-CDMA (Wideband Code Division Multiplex), LTE (Long Term Evolution), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

The interface between each one of the RBSs 1a-b and the RNC 5 is called Iub and the interface between the RNC 5 and core network is called Iu.

The RNC 5 has a PDCP PDU queue 7 and the two RBSs 1*a-b* have respective MAC-hs/ehs queues 9*a-b*. In the embodiment shown in FIG. 1, there is a Multi-flow HSDPA connection to the UE 2, whereby DL transmissions occur from both the first RBS 1*a* and the second RBS 1*b* to the UE 2.

When RLC transmissions get stuck on one link, it may be a good alternative to retransmit the RLC PDU(s) (Protocol Data Unit(s)) over the other link. If the retransmission cannot get through over the other link either, further retransmissions could be switched back to the original link. However, in this case there could be old copies existing at the link(s) besides the last retransmitted copy. In FIG. 1, this is illustrated with an original copy 10*a* of a PDU in the first MAC-hs/ehs queue 9*a* and a retransmitted copy 10*b* of the PDU in the second MAC-hs/ehs queue 9*b*.

Previously, when an RBS (Radio Base Station) drops an RLC PDU due to too long of a delay, the RLC is informed about this event only when the UE receives a newer PDU than the discarded one. A predefined timer could be used to control RLC PDU retransmission (independently of whether that PDU was discarded or only delayed), however, in this case more than one copy of the same RLC PDU can exist in the system. Duplicate copies can result in lower application level throughputs.

Such various problems may be overcome by concepts provided in the present disclosure by providing an RBS that operates to inform the RLC protocol in the RNC about RLC PDU loss over the TN (Transport Network) and RLC PDU drop in the RBS. This allows faster reaction of RLC in RNC to packet loss and provides more efficient RLC PDU retransmission mechanism without redundant RLC PDUs.

In accordance with at least some embodiments presented herein, the RBS 1*a-b* informs the RNC 5 about PDU drop/loss events, e.g. loss in the TN (Transport Network) 3 and drop from a MAC-hs/ehs (Media Access Control—high speed/enhanced high speed) queue. In this way the RLC can make more efficient and faster RLC PDU retransmission mechanism and can also avoid redundant RLC PDUs.

The RLC PDUs are transmitted over the TN using the Iub FP (Frame Protocol). The TN loss can be detected based on Iub FP sequence number. Based on the sequence number and the DRT (delay reference time) field of the received Iub FP data frames, the RNC RLC can determine the missing RLC PDUs (lost over the TN).

When packets are discarded from MAC-hs/ehs queue, then it is known how many RLC PDUs were dropped and which ones were dropped and this information can be used by the RNC for RLC retransmission.

A default behaviour packet loss due to residual H-ARQ (Hybrid Automatic Repeat reQuest) failure can be detected and handled by the normal RLC operation. However the mechanism presented herein can be implemented to respond to this loss as well.

Figures 2, 3:
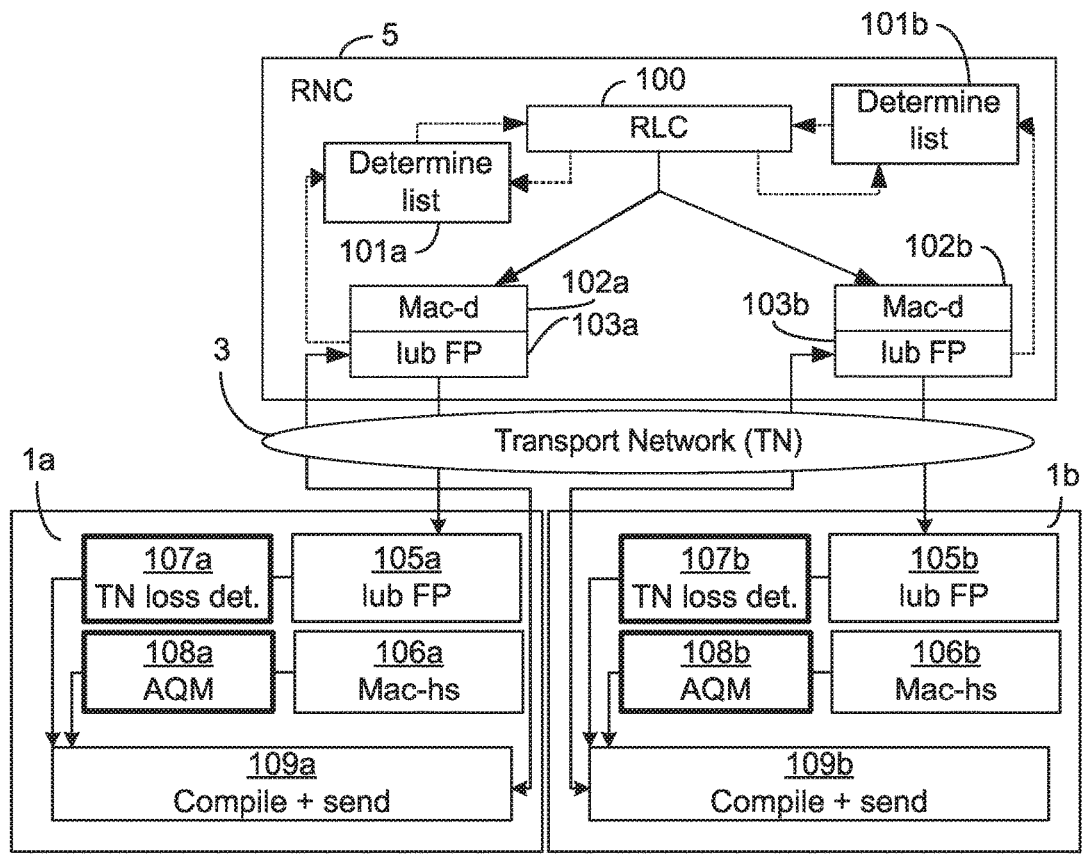
FIG. 2 is a schematic block diagram illustrating one embodiment of RNC and RBSs of FIG. 1.
FIG. 3 is a schematic diagram illustrating the structure of a drop indication control frame according to one embodiment.

FIG. 2 is a schematic block diagram illustrating one embodiment of RNC and RBSs of FIG. 1. The block diagram illustrates modules (comprising hardware and/or software), of which some are used for embodiments presented herein.

There is an RLC control module 100 and two respective MAC-d (Medium Access Control Dedicated Data) modules 102*a-b* for the two, via the transport network 3, connected radio base stations 1*a-b*. In conjunction with the two MAC-d modules 102*a-b*, there are two respective Iub FP modules for incoming and outgoing frame protocol communication.

The first base station 1*a* comprises its own Iub FP module 105*a* and a MAC-hs queue 106*a*. Alternatively or additionally, the MAC-hs queue could comprise a MAC-ehs queue. A TN loss detection module 107*a* is connected to the Iub FP module 105*a*. Moreover, an Active Queue Manager (AQM) 108*a* is connected to the MAC-hs queue 106*a* for e.g. detecting dropped expired packets in the MAC-hs queue 106*a*. A compile and send module 109*a* compiles information about lost or dropped packets from the AQM 108*a* and/or the TN loss detector module 107*a* and sends this via the TN 3 to the first Iub FP module 103*a* of the RNC 5.

A first determine list module 101 in the RNC then determines a list of dropped or lost RLC PDUs and provides this data to the RLC control module 100. The first determine list module 101 also uses input from the RLC comprising information about sent RLC PDUs such as sequence number (SN), sending time, etc.

The second radio base station 1*b* comprises modules corresponding to the first radio base station 1*a* and interacts with the RNC 3 in a corresponding way, whereby the RNC also comprises a second determine list module 101*b*.

In the RBSs 1*a-b*, relevant information is collected about lost/dropped PDUs and this information is thus sent back to the RNC 5. Based on this information the RLC 100 can retransmit these packets immediately without waiting for NACK for them from UE. Retransmission of these packets may be carried out on a different leg. These operations can provide more control over the RLC retransmission mechanism.

Although various embodiments are explained below in the context of multi-flow HSDPA operation, where PDUs are communicated toward a UE via a plurality of RBSs, some embodiments may be implemented in an RBS and RNC configured for single flow HSDPA operation.

It is noted that the MAC-hs/ehs priority queue additional identification may be needed for each PDU (e.g. the sequence number, DRT and CRC of the Iub DF (Data Frame) in which the given PDU was received).

In the RNC 5, the same information is stored for each RLC PDU transmitted in order to be able to identify the dropped PDU. In one embodiment, a hash table is used for fast lookup. When an RLC PDU is acknowledged by the UE, it is removed from the hash table.

To avoid RLC protocol problems, some embodiments do not allow large delay differences in the different legs. Some embodiments may operate to:
Discard PDUs which are queued too long in MAC-hs/ehs
Discard PDUs delayed too much over Iub.

To detect the Iub delay, the DRT field may be included in all of the HS-DSCH (High-Speed Downlink Shared Channel) data frames.

To detect the MAC-hs/ehs delay, some embodiments time-stamp PDUs when they arrive to the MAC-hs/ehs buffer.

When an RLC PDU is discarded, an RBS according to some embodiments communicates an indication of the discard and which PDUs were discarded to the RNC 5.

To identify the discarded PDUs there are three optional alternative methods that may be implemented:

In a first alternative, the first 2 or 3 octets of the PDU are sent back to the RNC. This contains the RLC header to be able to identify the dropped PDUs (the advantage of this solution is that it is a more direct information, therefore does not need a table in RNC at the expense of additional information storage in RBS).

In a second alternative, DRT field, the FSN field of the Iub Data Frame are sent back to the RNC, in which the PDUs were received. This optionally also includes the CRC of the DF to further enhance identification. Optionally, the position of the RLC PDU in the Iub DF is included when it is a goal to be able to identify separate PDUs (e.g. 1 for the 1st RLC PDU in a DF, 2 for the 2nd etc.)

In a third alternative, an additional sequence number is included in the Iub FP or MAC-d layer for the purposes of these identifications.

The original frame sequence number (FSN) is only 4 bits long, allowing only 16 different values. Hence, when we send back the FSN for identification, this is not sufficient in itself since there are may be many frames with the same FSN e.g. FSN=8. Hence, by increasing the range of possible values, a frame could be uniquely identified.

In one example, the additional sequence number is 15 bits long, allowing values between 0 and 32767 (decimal). The sequence number can be assigned to each frame by the RNC and is be used by the RBS to identify the set of MAC-d PDU's sent in frame. This can also be used by RNC to indicate the MAC-d PDU's that the Node B shall discard.

To identify the lost PDUs over the TN, similar optional operations and methods can be implemented, but the information to send back information about Iub frames is received right before and right after the detected Iub frame loss (because no direct information is known about the frames that are sent by the RNC, but not received in the RBS, so there is a need to use indirect information to find out what was lost).

This can e.g. be effected using the following:

In one embodiment, the first 2-3 octets of the PDUs that were received right before and right after the gap due to TN loss are sent back. This contains the RLC header and thus should be able to identify the dropped PDUs. In one embodiment, the header of the last PDU in the frame before the gap due to TN loss is sent back. In one embodiment, the header of the first PDU in the frame after the gap due to TN loss is sent back. These may optionally be combined.

In one embodiment, the DRT field, the FSN field and CRC of the Iub Data Frame back that were received right before and right after the gap due to TN loss are sent back to the RNC.

In one embodiment, an addition sequence number in the Iub FP or MAC-d layer for the purposes of this identification is included.

In accordance with some embodiments, a HS-DSCH PDU Drop Indication control frame is communicated to allow the RBS to notify the RNC about the frame drop.

Explicitly detected drop benefits form a different control frame format.

The identifiers disclosed above can alternatively be used in signalling from the RNC to the RBS for an explicit drop request.

FIG. 3 is a schematic diagram illustrating the structure of a drop indication control frame 199 according to one embodiment, sent from the compile and send module (109a-b of FIG. 2) of the RBS to the RNC. The fields shown in the control frame 199 of FIG. 3 are provided in some embodiments for a HS-DSCH PDU Drop Indication control frame of Type 1, related to explicit drop. In this embodiment, each row is an octet of data.

This type of control frame is used when the content of the dropped PDU or Data Frame is available in the RBS. In this case, direct identification of the PDUs is possible.

A drop reason field 200 indicates the reason for the drop. In this embodiment, there are the following possible values:
0 too high delay over Iub
1 too high delay in MAC-hs/ehs buffer
2 TN loss
3 unsuccessful HARQ (optional)

A field 202 for number of PDUs dropped is an integer indicating the number of PDUs that have been identified as having been dropped.

There may also be a spare section 201 of the control frame 199.

A field comprising several subfields 203a comprises the identifier of the first PDU that has been identified as being dropped. If there are more than one PDU that have been identified as being dropped, the identities of all dropped PDUs are included in the control frame, until an end identifier, each PDU corresponding to its own set of one or more subfields 203'a-c.

Figures 4, 5:
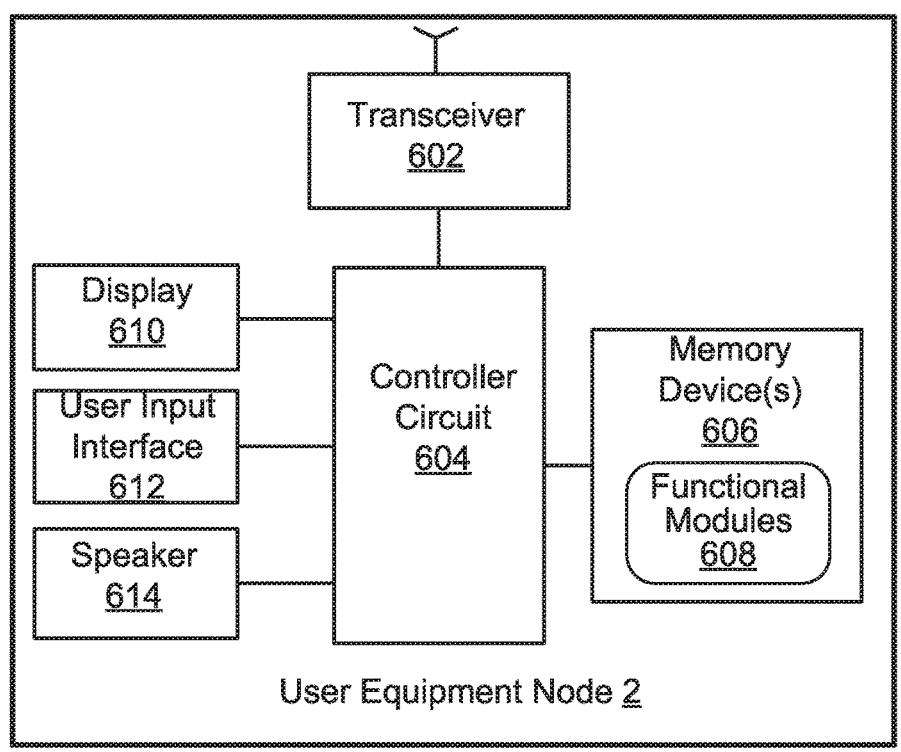
FIG. 4 is a schematic diagram illustrating the structure of a drop indication control frame according to one embodiment.
FIG. 5 is a schematic diagram illustrating some modules of a user equipment of FIG. 1.

FIG. 4 is a schematic diagram illustrating the structure of a drop indication control frame 198 according to one embodiment, sent from the compile and send module (109a-b of FIG. 2) of the RBS to the RNC. The fields shown in the control frame 198 of FIG. 4 are provided in some embodiments for a HS-DSCH PDU Drop Indication control frame of Type 1, related to a detected drop. In this embodiment, each row is an octet of data.

This type of control frame is used when the content of the dropped PDU or Data Frame is not available in the RBS. In this case only indirect identification of the PDUs is possible.

In this control frame 198, the following drop reasons are configured:
0 drop detected over Iub
1-3 reserved In this control frame 198, there is a set of subfields 210a-c comprising an identifier of the last PDU/DF before the lost PDU(s)/DF(s).

Moreover, there is a set of subfields 211a-c comprising an identifier of the first PDU/DF after the lost PDU(s)/DF(s).

FIG. 5 is a schematic diagram illustrating some modules of a user equipment of FIG. 1. The UE is configured according to some embodiments of the present invention.

The UE 2 includes a transceiver 602, a controller circuit 604, and a memory device(s) 606 containing functional modules 608. The UE 2 may further include other elements, such as a display 610, a user input interface 612, and a speaker 614.

The transceiver 602 (e.g. 3GPP compliant or other RF (Radio Frequency) communication transceiver) is configured to communicate with a base station over a wireless communication interface. The controller circuit 604 may include one or more data processing circuits, such as a general purpose and/or special purpose processor (e.g., microprocessor and/or digital signal processor). The controller circuit 604 is configured to execute computer program instructions from the functional modules 608 of the memory device(s) 606, described below as a computer readable medium, to perform at least some of the operations and methods described herein as being performed by a UE in accordance with one or more embodiments of the present invention.

The UE 2 may be a mobile telephone ("cellular" telephone), a data terminal, and/or another processing device with wireless communication capability, such as, for example, a portable computer, a pocket computer, a handheld computers, a laptop computers, an electronic book reader, and/or a video game console.

Figure 6:
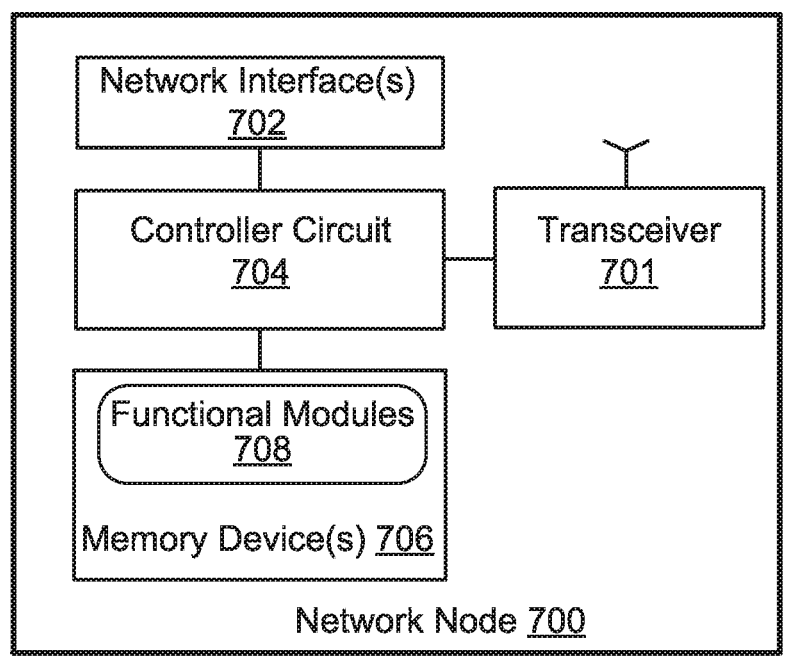
FIG. 6 is a schematic diagram illustrating some modules of a network node of FIG. 1.

FIG. 6 is a block diagram of a network node 700 configured according to some embodiments of the present invention, and elements of which may be included in the RBS, the RNC, and/or other nodes of the communications system of FIGS. 1-2. The network node 700 can include a transceiver 701, a network interface(s) 702, a controller circuit 704, application specific integrated circuit etc.), and a memory device(s) 706 being a computer program product containing functional modules 708.

The transceiver 701 (e.g., 3GPP compliant or other RF communication transceiver) is configured to communicate with one or more UEs or other nodes of the system. The controller circuit 704 may include one or more data processing circuits, such as a general purpose and/or special purpose processor (e.g., microprocessor and/or digital signal processor). The controller circuit 704 is configured to execute computer program instructions from the functional modules 708 of the memory device(s) 706, described below as a computer readable medium, to perform at least some of the operations and methods described herein as being performed by an RBS and/or RNC in accordance with one or more embodiments of the present invention. The network interface 702 communicates via a network with an RNC (when located in an RBS) or communicates via a network with an RBS and (when located in an RNC).

Figure 7:
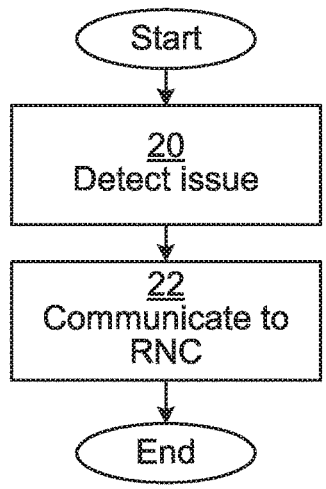
FIG. 7 is a flow chart illustrating a method according to one embodiment, performed in a radio base station of FIG. 1.

FIG. 7 is a flow chart illustrating a method according to one embodiment. The method is performed in the first RBS (1a of FIG. 1), in communication with the RNC (5 of FIG. 1). The RNC is configured for multi-flow HSDPA operation wherein PDUs are communicated toward the UE via the first RBS and at least one second RBS (1b of FIG. 1).

In a detect issue step 20, PDU drop events and/or loss events are detected, e.g. using the TN loss detector module and/or AQM of FIG. 2, as described above. In one embodiment, the detected PDU drop event corresponds to a drop from a MAC-hs/ehs queue.

In one embodiment, the detected PDU loss event corresponds to a loss in the transport network interconnecting the RNC and the RBS. The loss in the transport network can e.g. be detected based on a sequence number, for instance in accordance with Iub FP. The loss in the transport network can also be detected based on the sequence number and a delay reference time field of received Iub FP data frames.

In a communicate to RNC step 22, information is communicated from the RBS to the RNC, notifying of each detected PDU drop event and/or loss event. This can e.g. be effected using the compile and send module of FIG. 2, as described above.

The information communicated from the RBS to the RNC can be configured to cause the RNC to retransmit a PDU associated with the detected PDU drop event and/or loss event.

The information communicated from the RBS to the RNC can include one or more of a sequence number, a DRT, a CRC of an Iub DF, in which the PDU was received by the RBS.

Alternatively or additionally, the information communicated from the RBS to the RNC can comprise the first two octets of the PDU associated with the respective drop event and/or loss event. The PDU can e.g. be a MAC-d PDU.

Alternatively or additionally, the information communicated from the RBS to the RNC can comprise can comprises a CRC of a DF related to the PDU associated with the respective drop event and/or loss event.

Alternatively or additionally, the information communicated from the RBS to the RNC can comprise a position of the MAC-d, Medium Access Control Dedicated Data, PDU in an Iub DF.

Alternatively or additionally, the information communicated from the RBS to the RNC can provide an indication of Iub frames received right before and right after a detected Iub frame loss. In this way, the RNC can, in at least some cases, determine which one or more Iub frames that have been lost and can retransmit that or those ones.

Alternatively or additionally, the information communicated from the RBS to the RNC can comprise the first two octets of the PDUs that were received right before and right after a gap due to TN loss of the PDU. The PDU can be either a MAC-d or an RLC PDU.

Alternatively or additionally, the information communicated from the RBS to the RNC can comprise an RLC header associated with the dropped PDU. The PDU can be either a MAC-d or an RLC PDU.

Alternatively or additionally, the information communicated from the RBS to the RNC can comprise a header of the last PDU in a frame before a gap due to TN loss.

Alternatively or additionally, the information communicated from the RBS to the RNC can comprise the header of the first PDU in a frame after a gap due to TN loss.

Alternatively or additionally, the information communicated from the RBS to the RNC can comprise any one or more of a DRT field, an FSN (Frame Sequence Number) field and a CRC of Iub Data Frames that were received right before and right after a gap due to TN loss.

Alternatively or additionally, the information communicated from the RBS to the RNC can comprise the following fields: drop reason, number of PDUs dropped, and identifiers of all PDUs dropped, as described with reference to FIG. 3 above.

Alternatively or additionally, the information communicated from the RBS to the RNC can comprise the following fields: drop reason, identifier of the last PDU before the lost PDU and identifier of the first PDU after the lost PDU, as described with reference to FIG. 4 above.

Figure 8A:
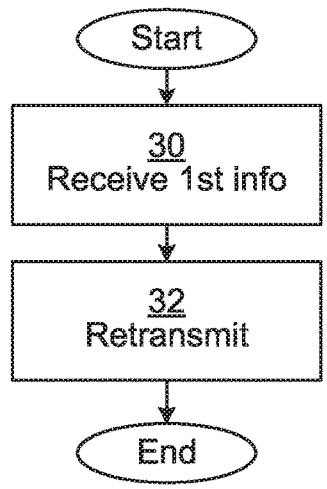
FIGS. 8A-B are flow charts illustrating methods performed in a radio network controller of FIG. 1.
Figure 8B:
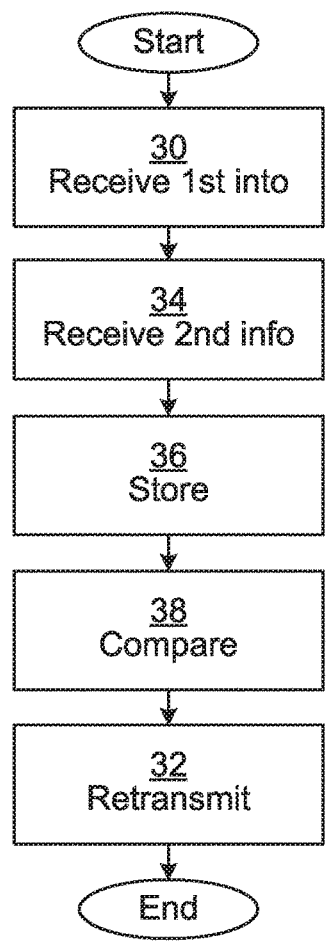

FIGS. 8A-B are flow charts illustrating methods performed in the RNC of FIG. 1. The RNC is configured for multi-flow HSDPA operation, wherein PDUs are communicated toward a the UE via at least the first and second RBSs (1a-b of FIG. 1). The method illustrated by FIG. 8A will be described first.

In a receive first information step 30, first information from the first RBS is received, notifying of a PDU drop event and/or loss event detected by the first RBS.

In a retransmit step 32, the PDU associated with the detected PDU drop event and/or loss event toward the UE is retransmitted in response to the received first information.

The retransmit step 32 can comprise retransmitting the PDU through a different route that includes a second RBS, i.e. avoiding the first RBS, which reported the loss and/or drop.

The method illustrated in FIG. 8B will now be described. The steps of FIG. 8A which also form part of FIG. 8B will not be described again.

In a receive second information step 34, second information is received from the RBS. The second information comprises the sequence number and/or the DRT and CRC of the Iub DF in which the PDU was transmitted to the RBS. This second information is used in conjunction with the first information of the receive first information step 30 to determine a dropped PDU.

In a store step 36, the second information is stored at the RNC.

In a compare step 38, the first and second information are compared to identify the PDU to be retransmitted.

Here now follows an itemized list of embodiments to further describe the concepts presented herein.

Embodiment 1. A method in a radio base station (RBS) that communicates with a radio network controller, said radio network controller (RNC) configured for multi-flow HSDPA operation wherein packet data units (PDUs) are communicated toward a user equipment node (UE) via the RBS and at least one other radio base station, the method comprising:

detecting PDU drop events and/or loss events; and communicating information from the RBS to the RNC notifying of each detected PDU drop event and/or loss event.

Embodiment 2. The method of Embodiment 1, wherein the detected PDU drop event corresponds to a drop from the MAC-hs/ehs queue.

Embodiment 3. The method of Embodiment 1, wherein the detected PDU loss event corresponds to a loss in a TN network interconnecting the RNC and the RBS and/or the at least one other radio base station.

Embodiment 4. The method of Embodiment 3, wherein the loss in a TN network is detected based on Iub FP sequence number, and/or based on the sequence number and a delay reference time field of the received Iub FP data frames.

Embodiment 5. The method of Embodiment 1, wherein the information communicated from the RBS to the RNC notifying of a detected PDU drop/loss event is configured to cause the RNC to retransmit the PDU associated with the detected PDU drop event and/or loss event.

Embodiment 6. The method of Embodiment 1, wherein communicating information from the RBS to the RNC notifying of each detected PDU drop event and/or loss event comprises:

communicating the information including the sequence number and/or the DRT and CRC of the Iub DF in which the PDU was received by the RBS.

Embodiment 7. The method Embodiment 1, wherein the information comprises the first 2-3 octets of the PDU.

Embodiment 8. The method Embodiment 7, wherein the information comprises a DRT field related to the PDU.

Embodiment 9. The method Embodiment 7, wherein the information comprises a CRC of a DF related to the PDU.

Embodiment 10. The method Embodiment 7, wherein the information comprises a position of the RLC PDU in a Iub DF.

Embodiment 11. The method Embodiment 7, wherein the information comprises an addition sequence number in the Iub FP or MAC-d layer.

Embodiment 12. The method of Embodiment 1, wherein the information provides an indication of Iub frames received right before and right after a detected Iub frame loss.

Embodiment 13. The method of Embodiment 12, wherein the information comprises the first 2-3 octets of the PDUs that were received right before and right after the gap due to TN loss of the PDU.

Embodiment 14. The method of Embodiment 13, wherein the information comprises the RLC header to assist with identifying the dropped PDU.

Embodiment 15. The method of Embodiment 12, wherein the information comprises the header of the last PDU in a frame before the gap due to TN loss.

Embodiment 16. The method of Embodiment 12, wherein the information comprises the header of the first PDU in a frame after the gap due to TN loss.

Embodiment 17. The method of Embodiment 12, wherein the information comprises the DRT field, the FSN field and CRC of Iub Data Frame that were received right before and right after the gap due to TN loss.

Embodiment 18. The method of Embodiment 12, wherein the information comprises an addition sequence number in the Iub FP or MAC-d layer to assist with identifying the dropped PDU.

Embodiment 19. The method of Embodiment 1, wherein the information comprises the fields identified in Section 3.1.1.

Embodiment 20. The method of Embodiment 1, wherein the information comprises the fields identified in Section 3.1.2.

Embodiment 21. A method in a radio network controller (RNC), the RNC configured for multi-flow HSDPA operation wherein packet data units (PDUs) are communicated toward a first user equipment node (UE) via at least two radio base stations (RBSs), the method comprising:

receiving first information from a first one of the RBSs notifying of a PDU drop event and/or loss event detected by the first RBS; and retransmit the PDU associated with the detected PDU drop event and/or loss event toward the UE in response to the received first information.

Embodiment 22. The method of Embodiment 21, further comprising retransmitting the PDU through a different route that includes a second RBS.

Embodiment 23. The method of Embodiment 21, further comprising: storing second information at the RNC that includes the sequence number and/or the DRT and CRC of the Iub DF in which the PDU was transmitted to the RBS; and receiving and comparing the first and second information to identify the PDU to be retransmitted.

Embodiment 24. The method of Embodiment 23, wherein storing second information comprises storing a hash value in a hash repository for comparison with a hash value representing the first information to identify the PDU to be retransmitted.

Embodiment 25. A method in a radio network controller (RNC), the RNC configured for single-flow HSDPA operation wherein packet data units (PDUs) are communicated toward a first user equipment node (UE) via a radio base station (RBS), the method comprising:

receiving first information from the RBS notifying of a PDU drop event and/or loss event detected by the RBS; and retransmit the PDU associated with the detected PDU drop event and/or loss event toward the UE through the RBS in response to the received first information.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed in a first radio base station (RBS) in communication with a radio network controller (RNC), the RNC being configured for multi-flow High-Speed Downlink Packet Access (HSDPA) operation wherein packet data units (PDUs) are communicated toward a user equipment (UE) node via the first RBS and at least one second RBS, the method comprising:

detecting PDU drop events; and communicating information from the first RBS to the RNC, in response to said detecting, the information notifying the RNC of which PDUs are affected by the detected events, wherein the information communicated from the first RBS to the RNC, in response to said detecting, comprises a sequence number of an Iub data frame in which a dropped PDU was received by the first RBS.

2. The method of claim 1, wherein one or more of the detected PDU drop events correspond to drops from a Media Access Control—high speed/enhanced high speed (MAC-hs/ehs) queue.

3. The method of claim 1, wherein the sequence number is a sequence number according to Iub Frame Protocol.

4. The method of claim 1, wherein the information communicated from the first RBS to the RNC is configured to cause the RNC to retransmit a PDU associated with the detected PDU drop event.

5. The method of claim 1, wherein the information communicated from the first RBS to the RNC, in response to said detecting, further comprises a Delay Reference Time (DRT) and Cyclic Redundancy Check (CRC) of an Iub data frame in which a dropped PDU was received by the first RBS.

6. The method of claim 1, wherein the information communicated from the first RBS to the RNC comprises the first two octets of the PDU associated with the respective drop event.

7. The method of claim 6, wherein the information communicated from the first RBS to the RNC comprises a Cyclic Redundancy Check (CRC) of a data frame related to the PDU associated with the respective drop event.

8. The method of claim 6, wherein the information communicated from the first RBS to the RNC comprises a position of the Medium Access Control Dedicated Data (MAC-d) PDU in an Iub data frame.

9. The method of claim 1, wherein the information communicated from the first RBS to the RNC comprises the following fields: drop reason, number of PDUs dropped, and identifiers of all PDUs dropped.

10. A radio base station (RBS) arranged to be in communication with a radio network controller (RNC), the RNC being configured for multi-flow High-Speed Downlink Packet Access (HSDPA) operation wherein packet data units (PDUs) are arranged to be communicated toward a user equipment (UE) node via the RBS and at least one second RBS, the radio base station comprising:
a processor; and
a non-transitory computer-readable medium storing instructions that, when executed by the processor, cause the radio base station to:
detect PDU drop events; and
communicate information from the RBS to the RNC, in response to detecting PDU drop events, the information notifying the RNC of which PDUs are affected by the detected events and comprising a sequence number of an Iub data frame in which a dropped PDU was received by the RBS.

11. A method performed in a radio network controller (RNC), the RNC being configured for multi-flow High-Speed Downlink Packet Access (HSDPA) operation wherein packet data units (PDUs) are communicated toward a first user equipment (UE) node via at least a first Radio Base Station (RBS) and a second RBS, the method comprising:
receiving first information from the first RBS, the information notifying the RNC of which PDU is affected by a PDU drop event detected by the first RBS and comprising a sequence number of an Iub data frame in which a dropped PDU was received by the first RBS; and
retransmitting the PDU associated with the detected PDU drop event toward the UE in response to the received first information.

12. The method of claim 11, wherein the retransmitting comprises retransmitting the PDU through a different route that includes the second RBS.

13. The method of claim 11, further comprising:
storing second information at the RNC, the second information including a sequence number of an Iub data frame in which the PDU was transmitted to the first RBS; and
comparing the first and second information to identify the PDU to be retransmitted.

14. The method of claim 13, further comprising receiving the second information.

15. The method of claim 13, wherein storing the second information further comprises storing a hash value representing the second information in a hash repository; and wherein said comparing comprises comparing the hash value representing the second information with a hash value representing the first information to identify the PDU to be retransmitted.

16. A radio network controller (RNC) being configured for multi-flow High-Speed Downlink Packet Access (HSDPA) operation wherein packet data units (PDUs) are arranged to be communicated toward a first user equipment (UE) via at least a first Radio Base Station (RBS) and a second RBS, the radio network controller comprising:
a processor; and
a non-transitory computer-readable medium storing instructions that, when executed by the processor, cause the radio network controller to:
receive first information from the first RBS, the information notifying the RNC of which PDU is affected by a PDU drop event detected by the first RBS and comprising a sequence number of an Iub data frame in which a dropped PDU was received by the first RBS; and
retransmit the PDU associated with the detected PDU drop event toward the UE in response to the received first information.

* * * * *